United States Patent [19]

Tanaka et al.

[11] 4,203,690
[45] May 20, 1980

[54] CERAMIC CUTTING TIP

[75] Inventors: Hiroshi Tanaka, Aichi; Kenji Sakurai, Komaki, both of Japan

[73] Assignee: NGK Spark Plug Co., Ltd., Nagoya, Japan

[21] Appl. No.: 940,772

[22] Filed: Sep. 8, 1978

Related U.S. Application Data

[63] Continuation of Ser. No. 687,758, May 19, 1976, abandoned.

[30] Foreign Application Priority Data

May 23, 1975 [JP] Japan .................................. 50-69816

[51] Int. Cl.² ............................................ B27G 15/00
[52] U.S. Cl. .................................. 407/119; 76/101 R; 76/101 A; 76/DIG. 11; 428/472
[58] Field of Search ............. 407/113, 119; 76/101 A, 76/101 R, DIG. 11; 264/62; 427/284, 154, 250, 255, 304, 305, 430 A; 428/472

[56] References Cited

U.S. PATENT DOCUMENTS

| | | | |
|---|---|---|---|
| 1,949,050 | 2/1934 | Howard et al. | 76/DIG. 11 |
| 2,184,776 | 12/1939 | Cottrell | 76/DIG. 11 |
| 2,963,739 | 12/1960 | Whitehurst et al. | 427/383 B |
| 3,152,385 | 10/1964 | Wheildon, Jr. et al | 76/101 R |
| 3,369,877 | 2/1968 | Humenik, Jr. et al. | 106/62 X |
| 3,690,921 | 9/1972 | Elmore | 264/62 |
| 3,882,579 | 5/1975 | Peacock | 407/119 |
| 3,977,061 | 8/1976 | Lindstrom et al. | 407/119 |
| 4,066,819 | 1/1978 | Anderson et al. | 428/472 |

OTHER PUBLICATIONS

Lowenheim, F. A. (editor), *Modern Electroplating,* 1974, John Wiley & Sons, Inc., New York, pp. 720–721.

*Primary Examiner*—Evan K. Lawrence
*Attorney, Agent, or Firm*—Stevens, Davis, Miller & Mosher

[57] ABSTRACT

A ceramic cutting tip which is applicable to a cutting tool of a lathe, a milling machine and the like is disclosed. The ceramic cutting tip comprises a ceramic sintered body including at least a cutting blade portion covered with a metal coating having a thickness of 1–10 $\mu$, wherein the metal employed in the metal coating is selected from the group consisting of nickel, cobalt, aluminum and copper.

2 Claims, 1 Drawing Figure

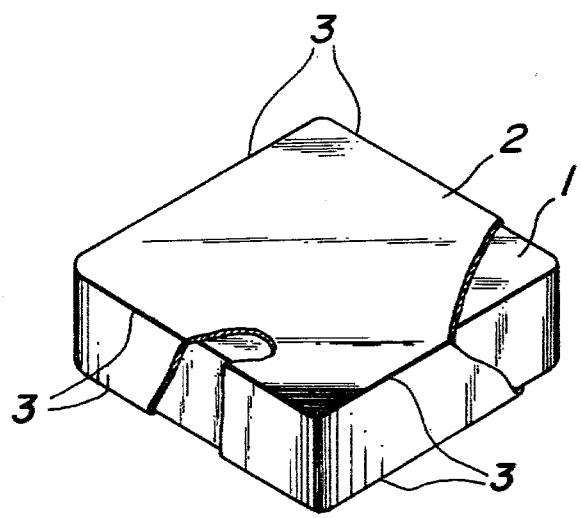

CERAMIC CUTTING TIP

This is a continuation of application Ser. No. 687,758, filed May 19, 1976, now abandoned.

BACKGROUND OF THE INVENTION

This invention relates to a ceramic cutting tip which is applicable to a cutting tool of a lathe, a milling machine and the like.

In the following, the term ceramic cutting tip shall be understood to mean a cutting tip formed of a so-called self-bonded sintered body whose crystalline particles are directly bonded with each other. A typical ceramic cutting tip contains highly pure alumina and alumina-carbide, for example, $Al_2O_3$—TiC. On the contrary, in a cutting tip formed of so-called extra-hard alloy or cermet, crystalline particles are bonded together through bonding metals such as iron, chromium, nickel and the like.

In the following Table 1 are shown compositions, hardness and traverse bending strengths of the ceramic cutting tip, extra-hard alloy cutting tip and cermet cutting tip.

Table 1

| Kind of chip | Composition | Hardness (HRA) | Traverse bending Strength ($kg/mm^2$) |
| --- | --- | --- | --- |
| Ceramic cutting tip | Highly pure Alumina $Al_2O_3$-carbide | 93–94 93.5–94.5 | 30–50 60–80 |
| Extra-hard alloy cutting tip | WC-bonding metal | 90–92 | 140–200 |
| Cermet cutting tip | TiC-bonding metal | 91–92 | 100–150 |

As seen from the above Table 1, the ceramic cutting tip is superior in hardness to the extra-hard alloy cutting tip and the cermet cutting tip, but inferior in traverse bending strength to the latter two and hence is brittle. That is, the ceramic cutting tip has an excellent wear resistance and hence is applicable to a cutting tool of a lathe, a milling machine and the like. However, the ceramic cutting tip has the disadvantage that there is a risk of the tip being easily damaged when it is brought into contact with another body or by the shock due to dropping produced when the tip is transported or packed or mounted on a cutting machine, and as a result, the ceramic cutting tip is difficult in handling.

SUMMARY OF THE INVENTION

An object of the invention, therefore, is to provide a ceramic cutting tip which can obviate the above mentioned disadvantage which has been encountered with the conventional ceramic cutting tip.

The present invention is a ceramic cutting tip comprising a ceramic sintered body including at least a cutting blade portion covered with a metal coating having a thickness of 1–10μ.

BRIEF DESCRIPTION OF THE DRAWING

The invention will now be described in greater detail with reference to the accompanying drawing, wherein:

The sole FIGURE is a perspective view showing one embodiment of the ceramic cutting tip according to the invention constructed as a throw away type tip.

DETAILED DESCRIPTION

Referring to the drawing, reference numeral 1 designates a square-shaped sintered body molded from a ceramic powder by means of a conventional sintering method or hot pressing method and provided at its upper and lower corners and side edges with cutting blade portions 3. Numeral 2 shows a metal coating having a thickness of at least 1μ and covered on the sintered body 1 by means of plating, vapor deposition, baking, spraying and the like. The metal employed in the metal coating formation is selected from the group consisting of nickel, cobalt, aluminum and copper.

As described above, if the cutting blade portion 3 of the ceramic cutting tip 1 is protected by means of the metal coating 2, it is possible to effectively obviate the above mentioned disadvantage which has been encountered with the conventional ceramic cutting tip.

It is preferable to make the thickness of the metal coating 2 with respect to the cutting blade portion at most 10μ. The use of the measures described ensures elimination of undesirable influences upon cutting tip performance such as cutting precision.

In the embodiment shown in the drawing, the ceramic cutting tip is made in the form of a throw away type tip.

The invention will now be described with reference to an example.

EXAMPLE

A number of square plate-shaped sintered bodies for throw away tips each formed of 99.5 wt.% of $Al_2O_3$ and having dimensions of 12.7 mm length × 12.7 mm width × 4.8 mm thickness, HRA hardness of 94.0 and traverse bending strength of 31 $Kg/mm^2$ shown in FIG. 1 were prepared, while a number of square plate-shaped sintered bodies for throw away tips each formed of 70 wt.% of $Al_2O_3$ and 30 wt.% of TiC and having dimensions of 12.7 mm length × 12.7 mm width × 4.8 mm thickness, HRA hardness of 94.5 and traverse bending strength of 75 $Kg/mm^2$ shown in FIG. 1 were prepared. These sintered bodies were treated with trichlene, washed with water, immersed in an aqueous solution of 20% hydrochloric acid, and washed with water. Thus cleaned sintered bodies were immersed into an activated treating liquid available in the market under the trade mark of "Pink Sumer" and into another activated treating liquid available in market under the trade mark of "Red Sumer" and then dipped into a non-electrolysis plating liquid available in market under the trade mark of "Blue Sumer" at 80° to 90° C. for several tens of seconds to several minutes to cover the overall surface of the sintered body with a nickel coating. The above described activated treating liquid and non-electrolysis plating liquid are sold by Japan Kanizen Co., Ltd., a licensee of GATC Co. in the U.S.A.

The sintered body formed of $Al_2O_3$ and the sintered body formed of $Al_2O_3$-TiC were covered with a nickel coating having different thicknesses in a range of 1–10μ as shown in the following Table 2. The thickness of the nickel coating was regulated by changing the time during which the sintered body is dipped into the non-electrolysis plating liquid.

Samples each formed of the above mentioned sintered body and covered with the nickel coating and another samples each formed of the same sintered body as the above mentioned sintered body and not covered with the nickel coating were subjected to the following shock resistance test.

Ten of the cutting tip samples were enclosed in a plastic container having a dimension of 60 mm width×90 mm length×30 mm height. The plastic container was subjected to a rocking motion one time per second with a span of 20 cm in a continuous manner repeatedly for 50 times in total. Then, the cutting tip samples were taken from the container and we precisely observed damage due to cuts whose width or depth is at least 1 mm produced at the corner or the edge of the cutting tip with the aid of a magnifying lens.

The above mentioned test was repeatedly effected several times to the same one cutting tip sample and the number of damages per one cutting tip sample was calculated to obtain the shock resistance of each of the cutting tip samples.

The results yielded from the above shock resistance test is shown in the following Table 2.

Table 2

| Sample No. | Sintered body | Thickness of nickle coating ($\mu$) | Number of damages per one cutting tip |
|---|---|---|---|
| 1 | $Al_2O_3$-TiC | 10 | 3.2 |
| 2 | " | 5 | 4.7 |
| 3 | " | 3 | 4.8 |
| 4 | " | 1 | 6.2 |
| 5 | $Al_2O_3$ | 10 | 5.7 |
| 6 | " | 5 | 6.1 |
| 7 | " | 3 | 6.7 |
| 8 | " | 1 | 10.2 |
| *9 | $Al_2O_3$-TiC | — | 12.3 |
| *10 | $Al_2O_3$ | — | 21.5 |

The above experimental tests have yielded the surprising result that the ceramic cutting tips each covered with a metal coating having a thickness of 1–10$\mu$ according to the invention, i.e. Samples No. 1–8, significantly improves damage due to cuts produced during its handling if compared with the conventional cutting tips each not covered with a metal coating and denoted by a symbol *. In addition, the ceramic cutting tip covered with a metal coating having a thickness of 1–10$\mu$ according to the invention has no influence upon cutting precision and other characteristics thereof, while the metal coating is easily peeled and scattered from the sintered body if the ceramic cutting tip according to the invention is submitted to cutting use.

What is claimed is:

1. A ceramic cutting tip of the throw-away type comprising a ceramic sintered body having at least two cutting blades and covered on at least a cutting blade portion with a metal coating having a thickness of 1–10$\mu$, said cutting blades being adapted to be employed in succession, wherein the metal employed in the metal coating is selected from the group consisting of nickel, cobalt, aluminum and copper.

2. A ceramic cutting tip of the throw-away type according to claim 1, wherein the metal coating is formed by plating, vapor deposition, baking or spraying.

* * * * *